Oct. 29, 1968 W. NIEHAUS 3,408,509
SCR COUNTER FEATURING TURN-OFF CIRCUITRY BY SUCCEEDING STAGE FOR PRECEDING STAGE
Filed March 2, 1966
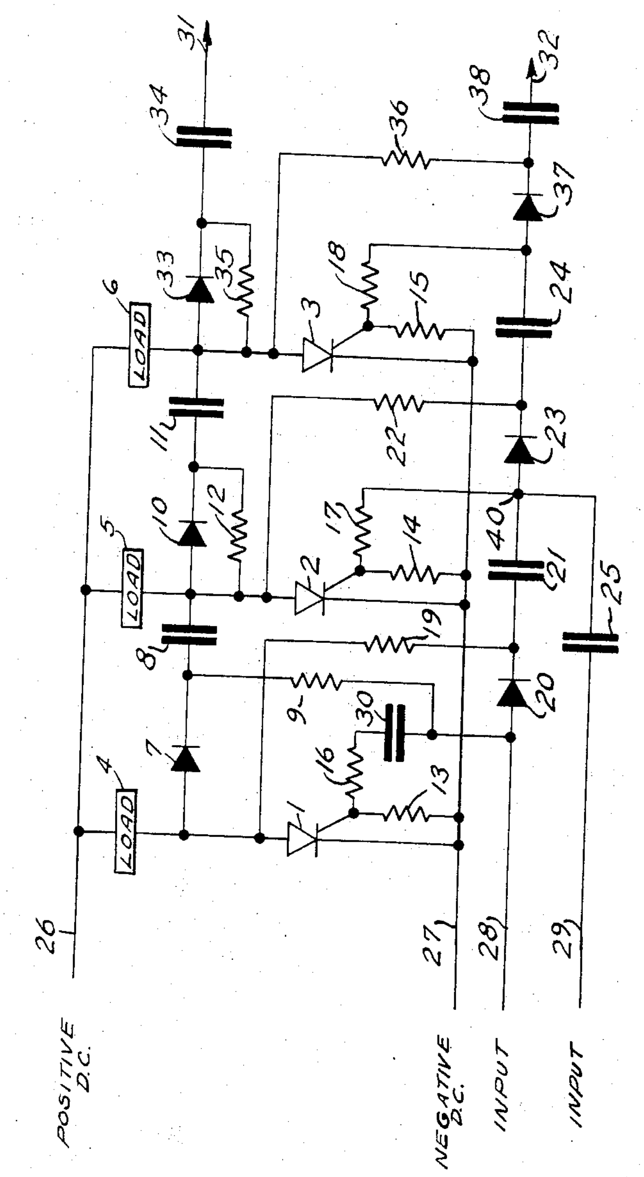

United States Patent Office 3,408,509

Patented Oct. 29, 1968

3,408,509

SCR COUNTER FEATURING TURN-OFF CIRCUITRY BY SUCCEEDING STAGE FOR PRECEDING STAGE

Wolfgang Niehaus, Hamburg-Neugraben, Germany, assignor to National Rejectors, Inc., St. Louis, Mo., a corporation of Missouri Filed Mar. 2, 1966, Ser. No. 531,157

Claims priority, application Germany, Mar. 10, 1965, K 55,498

9 Claims. (Cl. 307—225)

ABSTRACT OF THE DISCLOSURE

A plural-stage binary counter has an electronic switch in each stage thereof, has the input circuits of all of the stages thereof connected to the same input terminal, utilizes the states of conduction of the electronic switches of the various stages thereof to determine which stage shall receive the next signal applied to said input terminal, and has turn-off circuits which enable a succeeding stage to turn off a preceding stage but which keep a preceding stage from turning off a succeeding stage.

This invention relates to improvements in electronic computing and accumulating devices. More particularly, this invention relates to improvements in electronic computing and accumulating devices which use controlled rectifiers.

It is, therefore, an object of the present invention to provide an improved electronic computing and accumulating device which uses controlled rectifiers.

Electronic computing and accumulating devices are known and used; but those devices customarily use vacuum tubes or transistors. The present invention provides an electronic computing and accumulating device which uses controlled rectifiers instead of vacuum tubes or transistors; and that electronic computing and accumulating device has fewer-than-normal components, because the power-handling capacities of those controlled rectifiers usually eliminate all need of supplemental amplification stages. While controlled rectifiers tend to be more expensive than transistors, the use of controlled rectifiers rather than transistors in electronic computing and accumulating devices eliminates the need of the bi-stable flip-flop stages which are customarily used in such devices. As a result, the present invention makes it possible to provide an electronic computing and accumulating device which has large power-handling capacity, which uses just one controlled rectifier per stage, and which requires no supplemental amplification stages.

The power-handling capacities of controlled rectifiers make it possible for those controlled rectifiers to directly control greater values of power than transistors could directly control. For example, controlled rectifiers are commercially available which can directly control as many as seventy amperes at four hundred volts. The power-handling capabilities of such controlled rectifiers enable those controlled rectifiers to easily meet all of the power-handling requirements of electronic computing and accumulating services, even where those electronic computing and accumulating devices must handle large amounts of power. As a result, an electronic computing and accumulating device that is equipped with controlled rectifiers is particularly useful in those installations where an electronic computing and accumulating device must control the switching operations that occur in vending machines. Thus, in drink vendors where cups must be released for movement to cup-filling stations and then different ingredients from different spouts must be introduced into those cups, or in merchandise vendors where conveyor belts must be set in motion to deliver different commodities to a delivery station, electronic computing and accumulating devices which utilize controlled rectifiers are very useful.

The present invention provides an electronic computing and accumulating device which has only a few components but which has eight different switching conditions. Further, that electronic computing and accumulating device is made so it is modular in form; and hence that electronic computing and accumulating device can have additional components connected to it to enable it to have still further switching conditions. That electronic computing and accumulating device is made to add, but it can easily be modified to enable it to substract; and it can be modified to enable it to add and subtract. Furthermore, it is feasible to use the electronic computing and accumulating device of the present invention as part of a shift register.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

The drawing is a circuit diagram of one preferred embodiment of electronic computing and accumulating device that is made in accordance with the principles and teachings of the present invention.

Referring to the drawing in detail, the numeral 1 denotes a controlled rectifier which is part of a first stage of a preferred embodiment of electronic computing and accumulating device provided by the present invention; and that controlled rectifier is preferably a silicon controlled rectifier. The numerals 2 and 3 denote controlled rectifiers that are parts of the second and third stages of that electronic computing and accumulating device; and those controlled rectifiers also are preferably silicon controlled rectifiers. The power-handling capacities of those controlled rectifiers will be selected to enable those controlled rectifiers to easily accommodate all input signals supplied to that electronic computing and accumulating device, and to enable that electronic computing and accumulating device to supply the required amounts of power to the loads controlled by that electronic computing and accumulating device. The numerals 4, 5 and 6 denote loads that are controlled, respectively, by the controlled rectifiers 1, 2 and 3; and those loads could be indicator lamps, relay coils, resistors, or other electrical components.

A diode 7, a capacitor 8, and a resistor 9 constitute a re-setting circuit for the controlled rectifier 1; and a diode 10, a capacitor 11, and a resistor 12 constitute a re-setting circuit for the controlled rectifier 2. Resistors 13, 14 and 15 are connected, respectively, between the gates and cathodes of the controlled rectifiers 1, 2 and 3; and those cathodes and the lower terminals of those resistors are connected to a conductor 27 which is connected to the negative terminal of a source of direct current. A conductor 26 is connected to the positive terminal of that source of direct current; and that conductor is connected, respectively, to the anodes of the controlled rectifiers 1, 2 and 3 by the loads 4, 5 and 6.

A resistor 16 and a capacitor 30 connect the gate of the controlled rectifier 1 to a conductor 28, which is normally connected to the positive terminal of the source of direct current by a switch, not shown. A resistor 17, a junction 40, a capacitor 21, and a diode 20 connect the gate of the controlled rectifier 2 to the conductor 28. A resistor 18, a capacitor 24, a diode 23, junction 40, capacitor 21, and diode 20 connect the gate of the controlled rectifier 3 to the conductor 28. The resistors 16, 17 and 18 limit the values of the currents flowing through the gate-to-cathode circuits, respectively, of the controlled rectifiers 1, 2 and 3. A capacitor 25 connects the junction 40 to a conductor 29 which is normally connected to the positive terminal of the source of direct current by a second switch, not shown.

The first switch, not shown, must be capable of applying a single negative-going pulse to conductor 28 as it is actuated, and of applying a single positive-going pulse to that conductor as it is released. The second switch, not shown, must be capable of applying a single negative-going pulse to conductor 29 as it is actuated, and of applying a single positive-going pulse to that conductor as it is released. That first switch will preferably correspond to a unit value, such as an authentic German five pfennig coin; whereas that second switch will preferably correspond to a two-unit value, such as an authentic German ten pfennig coin.

A resistor 19 is connected between the anode of the controlled rectifier 1 and the cathode of the diode 20; and that resistor coacts with that diode and the capacitor 21 to constitute an "and" gate which controls the firing of the controlled rectifier 2. A resistor 22 is connected between the anode of the controlled rectifier 2 and the cathode of the diode 23; and that resistor coacts with that diode and the capacitor 24 to constitute an "and" gate which controls the firing of the controlled rectifier 3.

If the electronic computing and accumulating device provided by the present invention need only provide eight different switching conditions, no additional components are needed. However, if that electronic computing and accumulating device must provide more than eight different switching conditions, a diode 33, a capacitor 34, a resistor 35, and a conductor 31 will be needed to connect the anode of the controlled rectifier 3 to the anode of the controlled rectifier of a fourth stage. Also a diode 37, a capacitor 38, and a conductor 32 would be needed to connect the capacitor 24 to the current-limiting resistor for the gate-to-cathode circuit of the controlled rectifier of that fourth stage. In addition, a resistor 36 would be connected between the anode of the controlled rectifier 3 and the cathode of the diode 37; and that resistor would coact with that diode and the capacitor 38 to constitute an "and" gate that would control the firing of the controlled rectifier of that fourth stage.

Additional stages can be connected to the fourth stage, in the same manner in which that fourth stage is connected to the third stage. As a result, the electronic computing and accumulating device provided by the present invention can provide many different switching conditions.

It will be noted that the capacitor 25 connects the conductor 29 to the current-limiting resistor 17 for the controlled rectifier 2 and not to the current-limiting resistor 16 for the controlled rectifier 1. As a result, pulses which the second switch applies to the conductor 29 will bypass the controlled rectifier 1.

Prior to the time the first switch or the second switch is actuated, the controlled rectifiers 1, 2 and 3 will be non-conductive, positive voltages will be applied to the conductors 26, 28 and 29, capacitor 30 will be charged with the lower terminal positive, and capacitors 21, 24 and 25 will be charged with the left-hand terminals thereof positive. Also, the load 4 and resistor 19 make the voltage at the cathode of diode 20 close to the voltage applied to conductor 26. Similarly, the load 5 and resistor 22 make the voltage at the cathode of diode 23 close to the voltage applied to conductor 26. At this time, the electronic computing and accumulating device is in switching condition I; and that switching condition corresponds to a binary count of 0.

If the first switch is actuated, it will apply a negative-going pulse to conductor 28; and a small amount of current will flow from conductor 26 via load 4, diode 7, and resistor 9 to the conductor 28. Also, a small amount of current will flow from conductor 26 via load 5, capacitor 8, and resistor 9 to conductor 28; and that flow of current will charge the capacitor 8 with the right-hand terminal thereof positive. In addition, capacitor 30 will discharge via conductor 28, the first switch, conductor 27, and resistors 13 and 16. The discharging of the capacitor 30 will make the voltage at the anode of diode 20 less positive than the voltage at the cathode of that diode; and hence that diode will be back-biased and will become non-conductive.

When the first switch is released, and a positive-going pulse is applied to the conductor 28, that pulse will be applied to the capacitors 8 and 30; but that pulse will not be applied to the capacitor 21, because the diode 20 will be non-conductive. That pulse will cause the voltage at the left-hand terminal of the capacitor 8 to approach the voltage applied to the conductor 28; and that capacitor will discharge via load 5, load 4, and diode 7. That pulse also will cause the capacitor 30 to charge; and hence current will flow from conductor 28 via capacitor 30, resistor 16, and resistor 13 to conductor 27. The resulting voltage drop across resistor 13 will be great enough to cause sufficient current to flow through the gate-to-cathode circuit of the controlled rectifier 1 to render that controlled rectifier conductive. As that controlled rectifier becomes conductive, the load 4 will become energized, and the voltage at the anode of that controlled rectifier, and hence at the cathode of diode 20, will fall. The voltage at the anode of the controlled rectifier 1 will closely approach zero; but the voltage at the cathode of the diode 20 will be only about one-half of a volt less than the value of the positive-going pulse applied to the conductor 28—the rest of the potential difference between that positive-going pulse and the negative voltage at the conductor 27 appearing across the resistor 19. Thereupon that diode will be forward-biased and will become conductive and will enable the positive-going pulse applied to the conductor 28 to keep the capacitor 21 charged. The resistors 17 and 14 and the negative voltage applied to the conductor 27 will make the voltage at the anode of the diode 23 less positive than the voltage at the cathode thereof, and hence that diode will be back-biased and will be non-conductive. At this time, the electronic computing and accumulating device will be in switching condition II; and that switching condition corresponds to a binary count of 1.

The controlled rectifier 1 functions like a bi-stable flip-flop. Specifically, when that controlled rectifier is non-conductive, the load 4 does not have any current flowing through it, and the voltage at the anode of that controlled rectifier is the same as the supply voltage. That condition of that controlled rectifier corresponds to the condition of a bi-stable flip-flop which denotes a binary count of 0. When the controlled rectifier 1 is conductive, the load 4 becomes energized; and the voltage at the anode of that controlled rectifier drops close to zero. That condition of that controlled rectifier corresponds to the condition of a bi-stable flip-flop which denotes a binary count of 1.

In contrast to a bi-stable flip-flop, a controlled rectifier has only one output; and hence the second output customarily associated with a bi-stable flip-flop is not present in any of the stages of the electronic computing and accumulating device provided by the present invention. However, that second output is not necessary in that electronic computing and accumulating device. Each stage of the electronic computing and accumulating device of the present invention can provide the same coding that a bistable flip-flop can provide.

When the first switch is actuated a second time, a second negative-going pulse will be applied to the conductor 28; and a small amount of current will flow from conductor 26 via load 5, capacitor 8, and resistor 9 to conductor 28; and that flow of current will charge the capacitor 8 with the right-hand terminal thereof positive. In addition, capacitor 30 will discharge via conductor 28, the first switch, conductor 27, and resistors 13 and 16. The voltage at the anode of diode 20 will be close to zero, and the voltage at the cathode of that diode will drop close to zero. Simultaneously, the capacitor 21 will discharge via resistor 19, controlled rectifier 1, conductor 27, resistors 14 and 17, and junction 40.

When the first switch is released for the second time, a second positive-going pulse will be applied to the conductor 28; and that pulse will be applied to the capacitors 8, 30 and 21, that pulse being applied directly to capacitor 30, being applied to capacitor 8 by resistor 9, and being applied to capacitor 21 by diode 20 which it forward-biases and thus renders conductive. That pulse will cause the capacitor 30 to charge; and hence current will flow from conductor 28 via capacitor 30, resistor 16, and resistor 13 to conductor 27. The resulting voltage drop across resistor 13 will not be significant at this time because the controlled rectifier 1 is already conductive. That pulse also will cause the capacitor 21 to charge; and hence current will flow from conductor 28 via diode 20, capacitor 21, resistor 17, and resistor 14 to the conductor 27. The resulting voltage drop across the resistor 14 will cause sufficient current to flow through the gate-to-cathode circuit of the controlled rectifier 2 to render that controlled rectifier conductive. Thereupon the load 5 will become energized.

As the controlled rectifier 2 becomes conductive, the charge on the capacitor 8 will force some current to flow from the right-hand terminal of that capacitor via controlled rectifier 2, inversely through controlled rectifier 1, and diode 7 to the left-hand terminal of that capacitor. The resulting flow of inverse current through the controlled rectifier 1 will render that controlled rectifier nonconductive; and hence the load 4 will become de-energized. Also, current will flow from conductor 26 via load 4, diode 7, capacitor 8 and controlled rectifier 2 to the conductor 27, and current will flow from conductor 28 via resistor 9, capacitor 8, and controlled rectifier 2 to conductor 27; and, very quickly, that current will fully discharge the capacitor 8 and then charge that capacitor with the left-hand terminal thereof positive. When the capacitor 8 is fully charged, with the left-hand terminal thereof positive, the voltage at the anode of the controlled rectifier 1 will again be substantially equal to the voltage at the conductor 26. However, that controlled rectifier will remain non-conductive, because the capacitor 30 will have become charged with the lower terminal positive and the upper terminal close to zero.

As the controlled rectifier 2 becomes conductive, current will flow from conductor 26 via load 6, capacitor 11, resistor 12, and controlled rectifier 2 to the conductor 27; and that current will charge that capacitor with the right-hand terminal thereof positive. Also, as the controlled rectifier 2 becomes conductive, the voltage at the anode thereof, and hence at the cathode of diode 23, will closely approach zero. Thereupon, capacitor 24 will discharge via resistor 22, controlled rectifier 2, and resistors 15 and 18. At the time the controlled rectifier 1 became non-conductive, the voltage at the anode thereof, and hence at the cathode of diode 20, closely approached the voltage at the conductor 26. Consequently, the diode became back-biased and was rendered non-conductive; and the capacitor 21 remained charged via conductor 26, load 4, and resistor 19.

At this time, the load 4 will be de-energized and the load 5 will be energized. This means that the electronic computing and accumulating device is in switching condition III; and that switching condition corresponds to a binary count of 10.

When the first switch is actuated a third time, a third negative-going pulse will be applied to the conductor 28, and a small amount of current will flow from conductor 26 via load 4, diode 7, and resistor 9 to the conductor 28. Also, capacitor 8 will discharge via resistor 9, conductor 28, and the first switch to the conductor 27. In addition, capacitor 30 will discharge via conductor 28, the first switch, conductor 27, and resistors 13 and 16. The discharging of the capacitor 30 will make the voltage at the anode of diode 20 less positive than the voltage at the cathode of that diode; and hence that diode will be back-biased and will become non-conductive.

When the first switch is released, and a third positive-going pulse is applied to the conductor 28, that pulse will be applied to the capacitors 8 and 30; but that pulse will not be applied to the capacitor 21, because the diode 20 will be non-conductive. That pulse will cause the capacitor 30 to charge; and hence current will flow from conductor 28 via capacitor 30, resistor 16, and resistor 13 to conductor 27. The voltage drop across resistor 13 will be great enough to cause sufficient current to flow through the gate-to-cathode circuit of the controlled rectifier 1 to render that controlled rectifier conductive. As that controlled rectifier becomes conductive, the load 4 will become energized once again.

As the controlled rectifier 1 again becomes conductive, the capacitor 8 will tend to cause current to flow through that controlled rectifier and inversely through the controlled rectifier 2. However, the diode 7 will prevent such inverse current flow; and hence the controlled rectifier 2 will remain conductive. Also, the voltage at the anode of the controlled rectifier 1, and hence at the cathode of diode 20, will again fall. The voltage at the anode of the controlled rectifier 1 will again closely approach zero; but the voltage at the cathode of the diode 20 will again be only about one-half of a volt less than the value of the positive-going pulse applied to the conductor 28—the rest of the potential difference between that positive-going pulse and the negative voltage at the conductor 27 appearing across the resistor 19. Once again, that diode will be forward-biased and will become conductive and will enable the positive-going pulse applied to the conductor 28 to keep the capacitor 21 charged. At this time, the loads 4 and 5 will both be energized, and the electronic computing and accumulating device will be in switching condition IV; and that switching condition corresponds to a binary count of 11.

When the first switch is actuated a fourth time, a fourth negative-going pulse will be applied to the conductor 28; and that negative-going pulse will be applied to the capacitors 8 and 30 but will not be applied to the capacitors 21 and 24 because that negative-going pulse will render the diode 20 non-conductive. The application of that negative-going pulse to the capacitor 30 is not significant, because the controlled rectifier 1 is conductive. Similarly, the application of that negative-going pulse to the capacitor 8 is not significant, because the voltage at the right-hand terminal of that capacitor is close to zero.

When the first switch is released for the fourth time, a fourth positive-going pulse will be applied to the conductor 28; and that positive-going pulse will charge the capacitors 30, 21 and 24, charging the capacitor 30 directly, charging the capacitor 21 by the diode 20 which it forward-biases and thus renders conductive, and charging the capacitor 24 by the diode 20 and the capacitor 21 and by the diode 23 which it forward-biases and thus renders conductive. The charging of the capacitors 30 and 21 will not be significant, because the controlled rectifiers 1 and 2 are conductive. The charging of the capacitor 24 will cause current to flow from conductor 28 via diode 20, capacitor 21, diode 23, capacitor 24, resistor 18, and resistor 15 to the conductor 27; and the resulting voltage drop across the resistor 15 will be great enough to cause sufficient gate-to-cathode current to flow through the controlled rectifier 3 to render that controlled rectifier conductive. Thereupon, the load 6 will become energized.

Also, current will flow from the right-hand terminal of capacitor 11 via controlled rectifier 3, inversely through controlled rectifier 2 and the diode 10 to the left-hand terminal of that capacitor; and further current will flow from the right-hand terminal of capacitor 11 via controlled rectifier 3, inversely through controlled rectifier 1, diode 7, capacitor 8, and diode 10 to the left-hand terminal of that capacitor. That inverse current flow will render both the controlled rectifiers 1 and 2 non-conductive; and thereupon the loads 4 and 5 will become de-energized. At this time, only the load 6 will be energized, and the electronic computing and accumulating device will be in switching condition V; and that switching condition corresponds to a binary count of 100.

If further controlled rectifier stages were added to the three controlled rectifier stages shown by the drawing, current would flow through the load connected to the anode of the controlled rectifier of the next stage via conductor 31, capacitor 34, resistor 35, and controlled rectifier 3 to the conductor 27; and that current flow would make the right-hand terminal of that capacitor positive. The resistor 36 would apply the relatively low voltage at the anode of the controlled rectifier 3 to the cathode of the diode 37.

As the controlled rectifiers 1 and 2 became non-conductive, the voltages at the anodes thereof, and hence at the cathodes of the diodes 20 and 23, closely approached the positive voltage at conductor 26. As a result, the forward-biasing which those diodes experienced while the controlled rectifiers 1 and 2 were conductive will be eliminated.

When the first switch is actuated a fifth time, a fifth negative-going pulse will be applied to the conductor 28; and that negative-going pulse will be applied to the capacitors 8 and 30 but will not be applied to the capacitor 21 because the diode 20 will be back-biased. That negative-going pulse will discharge the capacitor 30, and it will cause the capacitor 8 to charge with the right-hand terminal thereof positive.

When the first switch is released a fifth time, the capacitor 30 will be charged and will cause the controlled rectifier 1 to become coductive again. Thereupon the load 4 will become energized again. Also as the controlled rectifier 1 again becames conductive, the capacitor 8 will discharge via load 5, load 4, and diode 7. At this time both of the loads 6 and 4 will be energized, and hence the electronic computing and accumulating device will be in switching condition VI; and that switching condition corresponds to a binary count of 101.

As the controlled rectifier 1 again becomes conductive, the voltage at the anode thereof, and hence at the cathode of the diode 20, will again fall. The voltage at the anode of the controlled rectifier 1 will closely approach zero and the voltage at the cathode of the diode 20 will drop about one-half of a volt below the value of the positive-going pulse applied to the conductor 28. As a result, the diode 20 will again be forward-biased and will again become conductive, whereas the diode 23 will remain back-biased and will remain non-conductive. The positive-going pulse applied to the conductor 28 will charge the capacitor 21 via the diode 20.

When the first switch is actuated a sixth time, a sixth negative-going pulse will be applied to the conductor 28; and that negative-going pulse will be applied to the capacitors 8, 30 and 21 but will not be applied to the capacitor 24, because the diode 23 is non-conductive. That negative-going pulse will charge the capacitor 8 with the right-hand terminal thereof positive, it will discharge the capacitor 30, and will discharge the capacitor 21.

When the first switch is released a sixth time, a sixth positive-going pulse will charge the capacitor 30; but the charging of that capacitor will not be significant because the controlled rectifier 1 is already conductive. That positive-going pulse will charge the capacitor 21, and the charging of that capacitor will cause the controlled rectifier 2 to become conductive. Thereupon, the load 5 will become energized.

As the controlled rectifier 2 again becomes conductive, the capacitor 8 will cause current to flow via controlled rectifier 2, inversely through controlled rectifier 1, and diode 7; and that inverse current flow will again render the controlled rectifier 1 non-conductive. Thereupon, the load 4 will become de-energized. This means that only the loads 5 and 6 will be energized; and the electronic computing and accumulating device will be in switching condition VII, and that switching condition corresponds to a binary count of 110.

As the controlled rectifier 2 again became conductive current flowed from the left-hand terminal of capacitor 11 via resistor 12, controlled rectifier 2, and inversely through controlled rectifier 3 to the right-hand terminal of that capacitor; but the capacitance of capacitor 11 and the resistance of resistor 12 are such that the value of that current is too low to render the controlled rectifier 3 non-conductive. Also, as the controlled rectifier 1 again became non-conductive, the voltage at the anode thereof, and hence at the cathode of the diode 20, closely approached the voltage at the conductor 26. As a result, the forward-biasing which that diode experienced while the controlled rectifier 1 was conductive was eliminated.

When the first switch is actuated a seventh time, a seventh negative-going pulse will be applied to the conductor 28; and that negative-going pulse will be applied to capacitors 8 and 30 but will not be applied to the capacitor 21, because the diode 20 is non-conductive. That negative-going pulse will discharge the capacitor 30; and it will discharge the capacitor 8 because the voltage at the right-hand terminal of that capacitor is close to zero.

When the first switch is released a seventh time, a seventh positive-going pulse will be applied to the conductor 28; and that positive-going pulse will charge the capacitor 30 and cause that capacitor to render the controlled rectifier 1 conductive again. Thereupon, the load 4 will become energized. At this time, all of the loads 4, 5 and 6 will be energized, and the electronic computing and accumulating device will be in switching condition VIII, and that switching condition corresponds to a binary count of 111.

As the controlled rectifier 1 again became conductive, the capacitor 8 tended to cause current to flow via controlled rectifier 1 and inversely through controlled rectifier 2; but the diode 7 prevented such flow. Also as the controlled rectifier 1 again became conductive, the voltage at the anode thereof, and hence at the cathode of the diode 20 again fell. The voltage at the anode of controlled rectifier 1 again closely approached zero and the voltage at the cathode of the diode 20 again became about one-half of a volt less than the value of the positive-going pulse applied to the conductor 28; and hence that diode again became conductive. The positive-going pulse applied to the conductor 28 will charge the capacitor 21 via the diode 20. The diodes 23 and 37 have the voltages at the cathodes and anodes thereof close to zero.

In the event an additional controlled rectifier was added to the circuit shown by the drawing, an eighth negative-going pulse applied to the conductor 28 would discharge the capacitors 30 and 21 but would not discharge the capacitor 24 and the capacitor 38, those capacitors having been discharged when the controlled rectifiers 2 and 3 were rendered conductive. As a result, an eighth posiitve-going pulse would be able to charge the capacitor 38 and cause that capacitor to render that additional controlled rectifier conductive. As that additional controlled rectifier became conductive, the capacitor 34 would cause current to flow through that controlled rectifier, inversely through controlled rectifier 3, and diode 33, would cause current to flow through that controlled rectifier, inversely through controlled rectifier 2, diode 10, capacitor 11, and diode 33, and would also cause current to flow through that controlled rectifier, inversely through controlled rectifier 1, diode 7, capacitor 8, diode 10, capacitor 11, and diode 33. The inverse current flow through the controlled rectifiers 3, 2, and 1 would render those controlled rectifiers non-conductive; and hence only the load associated with that additional controlled rectifier would be energized. The energization of that load would place the electronic computing and accumulating device in switching condition IX, and that switching condition corresponds to a binary count of 1000.

If an additional controlled rectifier is not added to the circuit shown by the drawing, the hereinbefore-described switching conditions will constitute all of the switching conditions that will be experienced by the electronic computing and accumulating device. To re-set that electronic computing and accumulating device, the voltage that is applied to the terminal 26 will be removed; and, thereupon, all of the controlled rectifiers 1, 2 and 3 will become non-conductive.

In the preceding description, it was assumed that pulses were supplied only to the conductor 28, and that no pulses were supplied to the conductor 29. However, pulses can be applied to either or both of the conductors 28 and 29. For example, a negative-going pulse can be applied to the conductor 29 at a time when all of the controlled rectifiers 1, 2 and 3 are non-conductive and all of the capacitors 21, 24, 25 and 30 are charged. That negative-going pulse will discharge the capacitor 25 via conductor 29, the second switch, conductor 27, and then through resistors 14 and 17.

An ensuing positive-going pulse that is applied to the conductor 29 will cause the capacitor 25 to charge; and current will then flow via resistor 17 and resistor 14 to the conductor 27. The resulting voltage drop across the resistor 14 will be great enough to cause sufficient current to flow through the gate-to-cathode circuit of the controlled rectifier 2 to render that controlled rectifier 2 conductive. Thereupon, the load 5 will become energized.

Current could not flow from conductor 29 via capacitor 25, junction 40 and capacitor 21, because the latter capacitor already is charged; and current could not flow from conductor 29 via diode 23 because that diode is not forward-biased. As a result, only the load 5 will be energized by that positive-going pulse; and hence the electronic computing and accumulating device will be in switching condition III, which corresponds to a binary count of 10.

As the controlled rectifier 2 became conductive, current flowed from conductor 26 via load 6, capacitor 11, resistor 12 and controlled rectifier 2 to conductor 27; and that capacitor became charged with the right-hand terminal thereof positive. Also, as that controlled rectifier became conductive, the voltage at the anode thereof, and hence at the cathode of the diode 23, approached zero, thereby making the voltages at the anode and cathode of that diode close to zero. The capacitor 24 discharged via resistor 22, controlled rectifier 2, resistor 15, and resistor 18.

When a second negative-going pulse is applied to the conductor 29, it will discharge the capacitor 25. When a second positive-going pulse is applied to the conductor 29, it will charge the capacitor 25 and it will also charge the capacitor 24. The charging of capacitor 25 will not be significant, because the controlled rectifier 2 is already conductive. The charging of capacitor 24 will cause current to flow via conductor 29, capacitor 25, junction 40, diode 23, capacitor 24, and resistors 18 and 15 to the conductor 27. The resulting flow of current through resistor 15 will provide a voltage drop which is great enough to cause sufficient current to flow through the gate-to-cathode circuit of controlled rectifier 3 to render that controlled rectifier conductive. The load 6 will thereupon become energized.

As the controlled rectifier 3 became conductive, current flowed from the right-hand terminal of capacitor 11 via that controlled rectifier, inversely through controlled rectifier 2, and diode 10 to the left-hand terminal of that capacitor; and that current flow rendered the controlled rectifier 2 non-conductive, thereby de-energizing the load 5. At this time only the load 6 will be energized; and hence the electronic computing and accumulating device will be in switching condition V, and that switching condition corresponds to a binary count of 100.

As the controlled rectifier 2 became non-conductive, the voltage at the anode thereof, and hence at the cathode of the diode 23, closely approached the voltage applied to the conductor 26. As a result the forward-biasing, which that diode experienced while the controlled rectifier 2 was conductive, was eliminated.

When a third negative-going pulse is applied to the conductor 29, it will not affect the capacitor 24 but it will discharge the capacitor 25. An ensuing third positive-going pulse that is applied to the conductor 29 will cause current to flow through capacitor 25 and resistors 17 and 14 to the conductor 27; and the resulting voltage drop across the resistor 14 will again be great enough to cause sufficient current to flow through the gate-to-cathode circuit of the controlled rectifier 2 to render that controlled rectifier conductive. Thereupon, the load 5 will again become energized. At this time, both of the loads 5 and 6 will be energized; and hence the electronic computing and accumulating device will be in switching condition VII, which switching condition corresponds to a binary count of 110.

Prior to the time the controlled rectifier 2 again became conductive, current flowed from conductor 26 via load 5, diode 10, capacitor 11, and controlled rectifier 3 to conductor 27 to charge that capacitor with the left-hand terminal thereof positive. As the controlled rectifier 2 then became conductive, current flowed from the left-hand terminal of capacitor 11 via resistor 12, controlled rectifier 2, and inversely through controlled rectifier 3 to the right-hand terminal of that capacitor; but the capacitance of capacitor 11 and the resistance of resistor 12 limit the value of that current to such a low level that the controlled rectifier 3 will remain conductive. Also as the controlled rectifier 2 became conductive, the voltage at the anode thereof, and hence at the cathode of the diode 23, approached zero.

If a negative-going pulse is then applied to the conductor 28, it will be applied to the capacitor 30 and will discharge that capacitor, but it will not be applied to the capacitor 21 because the diode 20 will be rendered non-conductive by the positive voltage at the cathode thereof. That negative-going pulse will also discharge the capacitor 8 via resistor 9, conductor 28 and the first switch to conductor 27.

An ensuing positive-going pulse that is applied to the conductor 28 will cause the capacitor 30 to charge, and will cause current to flow through the resistors 16 and 13. The resulting voltage drop across the resistor 13 will be great enough to cause sufficient current to flow through the gate-to-cathode circuit of the controlled rectifier 1 to render that controlled rectifier conductive. Thereupon, the load 4 will become energized. As the controlled rectifier 1 becomes conductive, the voltage at the anode thereof, and hence at the cathode of diode 20, will fall. The voltage at the anode of the controlled rectifier 1 will closely approach zero and the voltage at the cathode of that diode will again fall about one-half of a volt below the value of the positive-going pulse applied to the conductor 28 and will again forward-bias that diode. At this time, all of the loads 4, 5 and 6 will be energized, and the electronic computing and accumulating device will be in switching condition VIII, which switching condition corresponds to a binary count of 111.

If a negative-going pulse is applied to the conductor 29 at a time when the controlled rectifier 1 is conductive but the controlled rectifier 2 is non-conductive, the diode 23 will not be forward-biased; because the voltage at the anode of the controlled rectifier 2, and hence at the cathode of that diode, will be close to the voltage applied to the conductor 26. The voltage at the conductor 28, and hence at the junction between the diode 7 and the capacitor 8, will be positive; and the voltage at the right-hand terminal of that capacitor will be positive, but the voltage at the anode of that diode will be close to zero. As a result, the capacitor 8 will not have a charge stored thereon, and the diode 7 will be back-biased. The negative-going pulse that is applied to the conductor 29 will be applied to the capacitor 25, and it will discharge that capacitor; but that negative-going pulse will not be applied to the capacitor 24, because the diode 23 will be non-conductive, and that negative-going pulse will not be applied to the capacitor 8 because of diode 20.

An ensuing positive-going pulse that is applied to the conductor 29 will charge the capacitor 25; and current will flow through the resistors 17 and 14 to the conductor 27. The resulting voltage drop across the resistor 14 will be great enough to cause sufficient current to flow through the gate-to-cathode circuit of the controlled rectifier 2 to render that controlled rectifier conductive; and, thereupon, the load 5 will become energized.

As the controlled rectifier 2 became conductive, current did not tend to flow from the right-hand terminal of capacitor 8 thereof via the controlled rectifier 2, inversely through controlled rectifier 1, and diode 7 to the left-hand terminal of that capacitor; because that capacitor was not charged. Further, current could not have flowed in that manner, because the diode 7 is back-biased and is non-conductive. This means that the controlled rectifier 1 will continue to be conductive, and that the load 4 will continue to be energized; and hence both the loads 4 and 5 will be energized. In this way, actuation of the second switch, and the resulting application of a negative-going pulse and a positive-going pulse to the conductor 29, will add the value corresponding to the coin which actuated that second switch without disturbing the value previously accumulated by the rendering of the controlled rectifier 1 conductive.

As the controlled rectifier 2 became conductive, the voltage at the anode thereof, and hence at the cathode of the diode 23, dropped close to zero; and hence the voltage at that cathode approached the level of the voltage at the anode of that diode. Also, the capacitor 11 became charged with the right-hand terminal thereof positive.

If the first switch is then actuated, the resulting application of successive negative-going and positive-going pulses to the conductor 28 will cause the controlled rectifier 3 to become conductive; and, as that controlled rectifier becomes conductive, the capacitor 11 will render both of the controlled rectifiers 1 and 2 non-conductive. At that time, the electronic computing and accumulating device will be in switching condition V, and that switching condition will correspond to a binary count of 100.

If the second switch, rather than the first switch, had been actuated, the resulting application of successive negative-going and positive-going pulses to the conductor 29 would have caused the controlled rectifier 3 to become conductive; but the capacitor 11 would not have been able to render the controlled rectifier 1 non-conductive, because the diode 7 would be back-biased by the positive voltage which conductor 28 and resistor 9 apply to the cathode thereof. In such event, the electronic computing and accumulating device would be in switching condition VI, and that switching condition corresponds to a binary count of 101.

If the second switch is again actuated, while the electronic computing and accumulating device is in switching condition VI, the resulting application of successive negative-going and positive-going pulses to the conductor 29 will again cause the controlled rectifier 2 to become conductive; but the capacitor 8 will not be able to render the controlled rectifier 1 non-conductive, because the diode 7 will still be back-biased by the positive voltage which conductor 28 and resistor 9 apply to the cathode thereof. At this time, all of the controlled rectifiers 1, 2 and 3 will be conductive, and hence all of the loads 4, 5 and 6 will be energized. This means that the electronic computing and accumulating device will be in switching condition VIII, and that switching condition will correspond to a binary count of 111.

It will be noted that the application of pulses to the conductor 29 never directly affects the state of conduction of the controlled rectifier 1. Further, it will be noted that the application of pulses to the conductor 29 cannot enable the controlled rectifier 2 to directly affect the state of conduction of the controlled rectifier 1. This is important; because it enables credits, corresponding to the values of coins which actuate the second switch, to be accumulated without any loss of any previously-accumulated credits corresponding to the coins which actuate the first switch.

It should also be noted that the electronic computing and accumulating device provided by the present invention can receive a succession of pulses at the same input thereof, and can automatically apply each of those pulses to the appropriate stage thereof. Thus, when that electronic computing and accumulating device receives the first positive-going pulse from the first switch, it automatically applies that pulse to the first stage to render the controlled rectifier 1 conductive. When that electronic computing and accumulating device receives the second positive-going pulse from that first switch, it automatically applies that pulse to the second stage to render the controlled rectifier 2 conductive. The third positive-going pulse from that first switch is applied to the first stage to again render the controlled rectifier 1 conductive; and the fourth positive-going pulse from that first switch is applied to the third stage to render the controlled rectifier 3 conductive. The fifth positive-going pulse from that first switch is applied to the first stage to again render the controlled rectifier 1 coinductive; and the sixth positive-going pulse from that first switch is applied to the second stage to again render the controlled rectifier 2 conductive. Finally, the seventh positive-going pulse from that first switch is applied to the first stage to render the controlled rectifier 1 conductive once again. This shows that the electronic computing and accumulating device provided by the present invention can receive a succession of pulses at a common input, and can automatically apply each pulse to the appropriate stage thereof. As a result, that electronic computing and accumulating device does not require a separate input for each stage.

Similarly, a first positive-going pulse from the second switch will be applied to the second stage to render the controlled rectifier 2 conductive; and a second positive-going pulse from that second switch will be applied to the third stage to render the controlled rectifier 3 conductive. A third positive-going pulse from that second switch will be applied to the second stage to again render the controlled rectifier 2 conductive.

The diodes 7 and 10 are important in permitting a succeeding stage to render a preceding stage non-conductive, while keeping a preceding stage from rendering a succeeding stage non-conductive. Specifically, the diode 10 enables the controlled rectifier 3 of the third stage to render the controlled rectifier 2 of the second stage non-conductive, but keeps the controlled rectifier 2 of that second stage from rendering the controlled rectifier 3 of that third stage non-conductive. Similarly, the diode 7 permits the controlled rectifier 2 of the second stage to render the controlled rectifier 1 of the first stage non-conductive, but keeps the controlled rectifier 1 of that first stage from rendering the controlled rectifier 2 of that second stage non-conductive. As a result, the electronic computing and accumulating device provided by the present invention can accumulate credits without any loss of the credits stored therein.

The resistor 19 and the resistor 22 serve as "memories" of the conductive states of the controlled rectifiers 1 and 2 of the first and second stages. Specifically, whenever the controlled rectifier 1 is non-conductive, the resistor 19 will apply a positive voltage to the junction between the diode 20 and the capacitor 21; and that positive voltage will coact with that diode to keep a positive-going pulse from the first switch from rendering the controlled rectifier 2 conductive. Not until the controlled rectifier 1 has been rendered conductive, and the voltage at the lower terminal of the resistor 19 has fallen below the value of the positive-going pulses applied to the conductor 28, can a positive-going pulse from the first switch render the controlled rectifier 2 conductive. Similarly, whenever the controlled rectifier 2 is non-conductive, the resistor 22 will apply a positive voltage to the junction between the diode 23 and the capacitor 24; and that positive voltage will coact with that diode to keep a positive-going pulse from the first switch or the second switch from rendering the controlled rectifier 3 conductive. Not until the controlled rectifier 2 has been rendered conductive, and the voltage at the lower terminal of the resistor 22 has approached zero, can a positive-going pulse from the first switch or the second switch render the controlled rectifier 3 conductive.

Whereas the drawing and accompanying description have shown and described a preferred embodiment of the present invention, it should be apparent to those skilled in the art that various changes may be made in the form of the invention without affecting the scope thereof.

What I claim is:

1. A plural-stage binary counter that comprises: an input terminal that receives signals, a stage that includes an electronic switch, a second stage that includes a second electronic switch, an inuput circuit for said electronic switch of the first said stage that is connected to said input terminal to receive all signals applied to said input terminal, an input circiut for said second electronic switch of said second stage, a diode that is connected between the first said input circuit and the second said input circuit, said diode responding to forward-biasing thereof to connect said second said input circuit to said first said input circuit and thereby transmit to said second said input circuit a signal applied to said input terminal, said diode responding to back-biasing thereof to effectively disconnect said second said input circuit from said first said input circuit and thereby not transmit to said second said input circuit a signal applied to said input terminal, and a conductor connetced between the output of the first said stage and the cathode of said diode, said conductor acting, whenever said electronic switch of the first said stage is non-conductive, to apply a back-biasing voltage to said cathode of said diode, said conductor acting, whenever said electronic switch of the first said stage is conductive, to apply a forward-biasing voltage to said cathode of said diode, said electronic switch of the first said stage normally being non-conductive and normally enabling said conductor to back-bias said diode, whereby a first signal applied to said input terminal will be applied to said first said input circuit but will not be applied to said second said input circuit, said electronic switch of the first said stage responding to said first signal to become conductive and enable said conductor to forward-bias said diode, whereby a second signal applied to said input terminal will be applied to said first said input circuit and will also be applied to said second said input circuit.

2. A plural-stage binary counter that comprises: an input terminal that receives signals, a stage that includes an electronic switch, a second stage that includes a second electronic switch, an input circuit for said electronic switch of the first said stage that is connected to said input terminal to receive all signals applied to said input terminal, an input circuit for said second electronic switch of said second stage, a diode that is connected between the first said input circuit and the second said input circuit, said diode responding to forward-biasing thereof to connected said second said input circuit to said first said input circuit and thereby transmit to said second said input circuit a signal aplied to said input terminal, said diode responding to back-biasing thereof to effectively disconnect said second said input circuit from said first said input circuit and thereby not transmit to said second said input circuit a signal applied to said input terminal, and a conductor connected between the output of the first said stage and the cathode of said diode, said conductor acting, whenever said electronic switch of the first said stage is non-conductive, to apply a back-biasing voltage to said cathode of said diode, said conductor acting, whenever said electronic switch of the first said stage is conductive, to apply a forward-biasing voltage to said cathode of said diode, said electronic switch of the first said stage normally being non-conductive and normally enabling said conductor to back-bias said diode, whereby a first signal applied to said input terminal will be applied to said first said input circuit but will not be applied to said second said input circuit, said electronic switch of the first said stage responding to said first signal to become conductive and enable said conductor to forward-bias said diode, whereby a second signal applied to said input terminal will be applied to said first said input circuit and will also be applied to said second said input circuit the first said electronic switch being a silicon controlled rectifier, said second electronic switch being a silicon controlled rectifier.

3. A plural-stage binary counter that comprises: an input terminal that receives signals, a stage that includes an electronic switch, a second stage that includes a second electronic switch, an input circuit for said electronic switch of the first said stage that is connected to said input terminal to receive all signals applied to said input terminal, an input circuit for said second electronic switch of said second stage, a diode that is connected between the first said input circuit and the second said input circuit, said diode responding to forward-biasing thereof to connect said second said input circuit to said first said input circuit and thereby transmit to said second said input circuit a signal applied to said input terminal, said diode responding to back-biasing thereof to effectively disconnect said second said input circuit from said first said input circuit and thereby not transmit to said second said input circuit a signal applied to said input terminal, and a conductor connected between the output of the first said stage and the cathode of said diode, said conductor acting, whenever said electronic switch of the first said stage is non-conductive, to apply a back-biasing voltage to said cathode of said diode, said conductor acting, whenever said electronic switch of the first said stage is conductive, to apply a forward-biasing voltage to said cathode of said diode, said electronic switch of the first said stage normally being non-conductive and normally enabling said conductor to back-bias said diode, whereby a first signal applied to said input terminal will be applied to said first said input circuit but will not be applied to said second said input circuit, said electronic switch of the first said stage responding to said first signal to become conductive and enable said conductor to forward-bias said diode, whereby a second signal applied to said input terminal will be applied to said first said input circuit and will also be applied to said second said input circuit, a third stage including a third electronic switch, a second diode connecting the input circuit for said third electronic switch of said third stage to said second said input circuit, a second conductor connected between the output of said second stage and the cathode of said second diode, said second conductor acting whenever said second electronic switch of said second stage is non-conductive to apply a back-biasing voltage to said cathode of said second diode, said second conductor acting whenever said second electronic switch of said second stage is conductive to apply a forward-biasing voltage to said cathode of said second diode, said second diode responding to forward-biasing thereof to connect the third said input circuit to said second said input circuit and thereby transmit to said third said input circuit a signal applied to said second said input circuit, said second diode responding to back-biasing thereof to effectively disconnect said third said input circuit from said second said input circuit and thereby not transmit to said third said input circuit a signal applied to said second said input circuit, the first said diode and said second diode coacting whenever said electronic switch of the first said stage and said second electronic switch of said second stage are conductive to connect said input terminal to said third said input circuit, the first said diode acting whenever said electronic switch of the first said stage is non-conductive to effectively disconnect said third said input circuit from said input terminal, said second diode acting whenever said second electronic switch of said second stage is non-conductive to effectively disconnect said third said input circuit from said input terminal.

4. A plural-stage binary counter that comprises: an input terminal that receives signals, a stage that includes an electronic switch, a second stage that includes a second electronic switch, an input circuit for said electronic switch of the first said stage that is connected to said input terminal to receive all signals applied to said input terminal, an input circuit for said second electronic switch of said second stage, a diode that is connected between the first said input circuit and the second said input circuit, said diode responding to forward-biasing thereof to connect said second said input circuit to said first said input circuit and thereby transmit to said second said input circuit a signal applied to said input terminal, said diode responding to back-biasing thereof to effectively disconnect said second said input circuit from said first said input circuit and thereby not transmit to said second said input circuit a signal applied to said input terminal, and a conductor connected between the output of the first said stage and the cathode of said diode, said conductor acting, whenever said electronic switch of the first said stage is non-conductive, to apply a back-biasing voltage to said cathode of said diode, said conductor acting, whenever said electronic switch of the first said stage is conductive, to apply a forward-biasing voltage to said cathode of said diode, said electronic switch of the first said stage normally being non-conductive and normally enabling said conductor to back-bias said diode, whereby a first signal applied to said input terminal will be applied to said first said input circuit but will not be applied to said second said input circuit, said electronic switch of the first said stage responding to said first signal to become conductive and enable said conductor to forward-bias said diode, whereby a second signal applied to said input terminal will be applied to said first said input circuit and will also be applied to said second said input circuit, a second input terminal connected to said second said input circuit and to said cathode of said diode, said second input terminal being connected to apply a further signal to said second said input circuit but said diode keeping said further signal from being applied to said input circuit for said electronic switch of the first said stage.

5. A plural-stage binary counter that comprises: an input terminal that receives signals, a stage that includes an electronic switch, a second stage that includes a second electronic switch, an input circuit for said electronic switch of the first said stage that is connected to said input terminal to receive all signals applied to said input terminal, an input circuit for said second electronic switch of said second stage, a diode that is connected between the first said input circuit and the second said input circuit, said diode responding to forward-biasing thereof to connect said second said input circuit to said first said input circuit and thereby transmit to said second said input circuit a signal applied to said input terminal, said diode responding to back-biasing thereof to effectively disconnect said second said input circuit from said first said input circuit and thereby not transmit to said second said input circuit a signal applied to said input terminal, and a conductor connected between the output of the first said stage and the cathode of said diode, said conductor acting, whenever said electronic switch of the first said stage is non-conductive, to apply a back-biasing voltage to said cathode of said diode, said conductor acting, whenever said electronic switch of the first said stage is conductive, to apply a forward-biasing voltage to said cathode of said diode, said electronic switch of the first said stage normally being non-conductive and normally enabling said conductor to back-bias said diode, whereby a first signal applied to said input terminal will be applied to said first said input circuit but will not be applied to said second said input circuit, said electronic switch of the first said stage responding to said first signal to become conductive and enable said conductor to forward-bias said diode, whereby a second signal applied to said input terminal will be applied to said first said input circuit and will also be applied to said second said input circuit, a third stage including a third electronic switch, a second diode connecting the input circuit for said third electronic switch of said third stage to said second said input circuit, a second conductor connected between the output of said second stage and the cathode of said second diode, said second conductor acting whenever said second electronic switch of said second stage is non-conductive to apply a back-biasing voltage to said cathode of said second diode, said second conductor acting whenever said second electronic switch of said second stage is conductive to apply a forward-biasing voltage to said cathode of said second diode, said second diode responding to forward-biasing thereof to connect said third said input circuit to said second said input circuit and thereby transmit to said third said input circuit a signal applied to said second said input circuit, said second diode responding to back-biasing thereof to effectively disconnect said third said input circuit from said second said input circuit and thereby not transmit to said third said input circuit a signal applied to said second said input circuit, the first said diode and said second diode coacting whenever said electronic switch of the first said stage and said second electronic switch of said second stage are conductive to connect said input terminal to said third said input circuit the first said diode acting whenever said electronic switch of the first said stage is non-conductive to effectively disconnect said third said input circuit from said input terminal, said second diode acting whenever said second electronic switch of said second stage is non-conductive to effectively disconnect said third said input circuit from said input terminal, a second input terminal connected to said second said input circuit and to said cathode of the first said diode and to the anode of said second diode, said second input terminal being adapted to apply a further signal to said second said input circuit but said diode keeping said further signal from being applied to said first said input circuit, said second diode permitting said further signal to be applied to said third said input circuit whenever said second electronic switch of said second stage is conductive but keeping said further signal from being applied to said third said input circuit whenever said second electronic switch of said second stage is non-conductive.

6. A plural-stage binary counter which comprises: a stage that includes an electronic switch which responds to inverse flow of commutating current through it to become non-conductive, a second stage that includes a second electronic switch, a commutating circuit for the first said electronic switch that is connected to the outputs of said electronic switches of said stages and that includes means to selectively render the first said electronic switch non-conductive said commutating circuit including a unidirectional element that permits said means of said commutating circuit to cause commutating current to flow inversely through the first said electronic switch but that keeps said means of said commutating circuit from causing commutating current to flow inversely through said second electronic switch, whereby said means of said commutating circuit can respond to the rendering of said second electronic switch conductive to render the first said electronic switch non-conductive but cannot respond to the rendering of the first said electronic switch conductive to render said second electronic switch non-conductive, said commutating circuit including a commutating capacitor, said unidirectional element being a diode.

7. A plural-stage binary counter which comprises: a stage that includes an electronic switch which responds to inverse flow of commutating current through it to become non-conductive, a second stage that includes a second electronic switch, a commutating circuit for the first said electronic switch that is connected to the outputs of said electronic switches of said stages and that includes means to selectively render the first said electronic switch non-conductive, said commutating circuit including a unidirection element that permits said means of said commutating circuit to cause commutating current to flow inversely through the first said electronic switch but that keeps said means of said commutating circuit from causing commutating current to flow inversely through said second electronic switch, whereby said means of said commutating circuit can respond to the rendering of said second electronic switch conductive to render the first said electronic switch non-conductive but cannot respond to the rendering of the first said electronic switch conductive to render said second electronic switch non-conductive, said commutating circuit including a commutating capacitor, an impedance connected to said capacitor to permit said capacitor to be charged by current flowing in a direction opposite to the direction of flow permitted by said unidirectional element.

8. A plural-stage binary counter which comprises: a stage that includes an electronic switch which responds to inverse flow of commutating current through it to become non-conductive, a second stage that includes a second electronic switch, a commutating circuit for the first said electronic switch that is connected to the outputs of said electronic switches of said stages and that includes means to selectively render the first said electronic switch non-conductive, said commutating circuit including a unidirectional element that permits said means of said commutating circuit to cause commutating current to flow inversely through the first said electronic switch but that keeps said means of said commutating circuit from causing commutating current to flow inversely through said second electronic switch, whereby said means of said commutating circuit can respond to the rendering of said second electronic switch conductive to render the first said electronic switch non-conductive but cannot respond to the rendering of the first said electronic switch conductive to render said second electronic switch non-conductive, said commutating circuit including a commutating capacitor, an impedance connected to said capacitor to permit said capacitor to be charged by current flowing in a direction opposite to the direction of flow permitted by said unidirectional element, said impedance being connected to the output of the first said electronic switch but being dimensioned to keep the value of inverse current flowing through the first said electronic switch below the level needed to commutate the first said electronic switch.

9. A plural-stage binary counter which comprises: a stage that includes an electronic switch which responds to inverse flow of commutating current through it to become non-conductive, a second stage that includes a second electronic switch, a commutating circuit for the first said electronic switch that is connected to the outputs of said electronic switches of said stages, and that includes means to selectively render the first said electronic switch non-conductive, said commutating circuit including a unidirectional element that permits said means of said commutating circuit to cause commutating current to flow inversely through the first said electronic switch but that keeps said means of said commutating circuit from causing commutating current to flow inversely through said second electronic switch, whereby said means of said commutating circuit can respond to the rendering of said second electronic switch conductive to render the first said electronic switch non-conductive but cannot respond to the rendering of the first said electronic switch conductive to render said second electronic switch non-conductive, said commutating circuit including a commutating capacitor, an impedance connected to said capacitor to permit said capacitor to be charged by current flowing in a direction opposite to the direction of flow permitted by said unidirectional element, said impedance being isolated from the output of the first said electronic switch to keep current flowing through said impedance in said direction opposite to the direction of flow permitted by said unidirectional element from commutating the first said electronic switch.

References Cited

UNITED STATES PATENTS

| | | | |
|---|---|---|---|
| 2,861,216 | 11/1958 | England | 328—37 X |
| 3,049,642 | 8/1962 | Quinn | 307—88.5 X |
| 3,260,858 | 7/1966 | Kueber | 307—88.5 |
| 3,317,751 | 5/1967 | Libby et al. | 307—88.5 |

OTHER REFERENCES

Solid State Products (SSP) in Bulletin D410–02, March 1960, pp. 10 and 11.

JOHN S. HEYMAN, *Primary Examiner.*